United States Patent [19]

Darnell et al.

[11] Patent Number: 4,752,924
[45] Date of Patent: Jun. 21, 1988

[54] RING PACKET SWITCH

[75] Inventors: Joseph W. Darnell, Gahanna; Allen D. Fergeson, Johnstown; David M. Rouse, Columbus; Richard E. Wallace, Newark; Charles M. Zelms, Worthington, all of Ohio

[73] Assignee: American Telephone and Telegraph Company, AT&T Bell Laboratories, Murray Hill, N.Y.

[21] Appl. No.: 772,926

[22] Filed: Sep. 5, 1985

[51] Int. Cl.⁴ .............................................. H04J 3/02
[52] U.S. Cl. ........................................ 370/86; 370/16; 340/825.01; 340/825.05
[58] Field of Search ................... 370/86, 88, 85, 16; 340/825.05, 825.01

[56] References Cited

U.S. PATENT DOCUMENTS

| | | | |
|---|---|---|---|
| 4,112,488 | 9/1978 | Smith | 364/200 |
| 4,205,326 | 5/1980 | Porter et al. | 370/86 |
| 4,293,948 | 10/1981 | Soderblom | 370/90 |
| 4,334,305 | 6/1982 | Girardi | 370/86 |
| 4,383,314 | 5/1983 | Tam | 370/86 |
| 4,460,994 | 7/1984 | Scanlon et al. | 370/88 |
| 4,554,659 | 11/1985 | Blood et al. | 370/86 |
| 4,554,673 | 11/1985 | Stevens | 370/86 |

Primary Examiner—Douglas W. Olms
Attorney, Agent, or Firm—Dwight A. Marshall

[57] ABSTRACT

A data communication network comprising a plurality of nodes interconnecting transmission paths in a ring structure arranged to propagate data messages between data systems coupled to the network by the nodes in opposite directions around the network ring structure. An executive node having ring interface units interconnecting ones of the transmission paths is arranged to selectively couple a network control processor with various sectors of the transmission paths to enable the network control processor to control the traffic flow of data messages on the data communication network.

15 Claims, 7 Drawing Sheets

FIG. 4

| P | C | 7 | 6 | 5 | 4 | 3 | 2 | 1 | 0 | |
|---|---|---|---|---|---|---|---|---|---|---|
| | 1 | ▨ | DESTINATION CONTROL | | ▨ | CONTROL CODE | | | | BYTE1 |
| | 0 | MESSAGE LENGTH | | | | | | | ▨ | BYTE2 |
| | 0 | SOURCE NODE OR NETWORK CONTROL PROCESSOR ADDRESS | | | | | | | | BYTE3 |
| | 0 | SOURCE RING ID | SOURCE NODE OR NETWORK CONTROL PROCESSOR ADDRESS | | | | | | | BYTE4 |
| | 0 | DESTINATION NODE OR NETWORK CONTROL PROCESSOR ADDRESS | | | | | | | | BYTE5 |
| | 0 | DEST RING ID | DISTINATION NODE OR NETWORK CONTROL PROCESSOR ADDRESS | | | | | | | BYTE6 |
| | 0 | DATA | | | | | | | | |
| | 0 | DATA | | | | | | | | |
| | 0 | DATA | | | | | | | | |
| | 0 | DATA | | | | | | | | |
| | | | | | | | | | | |
| | 0 | DATA | | | | | | | | BYTEn |

DATA MESSAGE

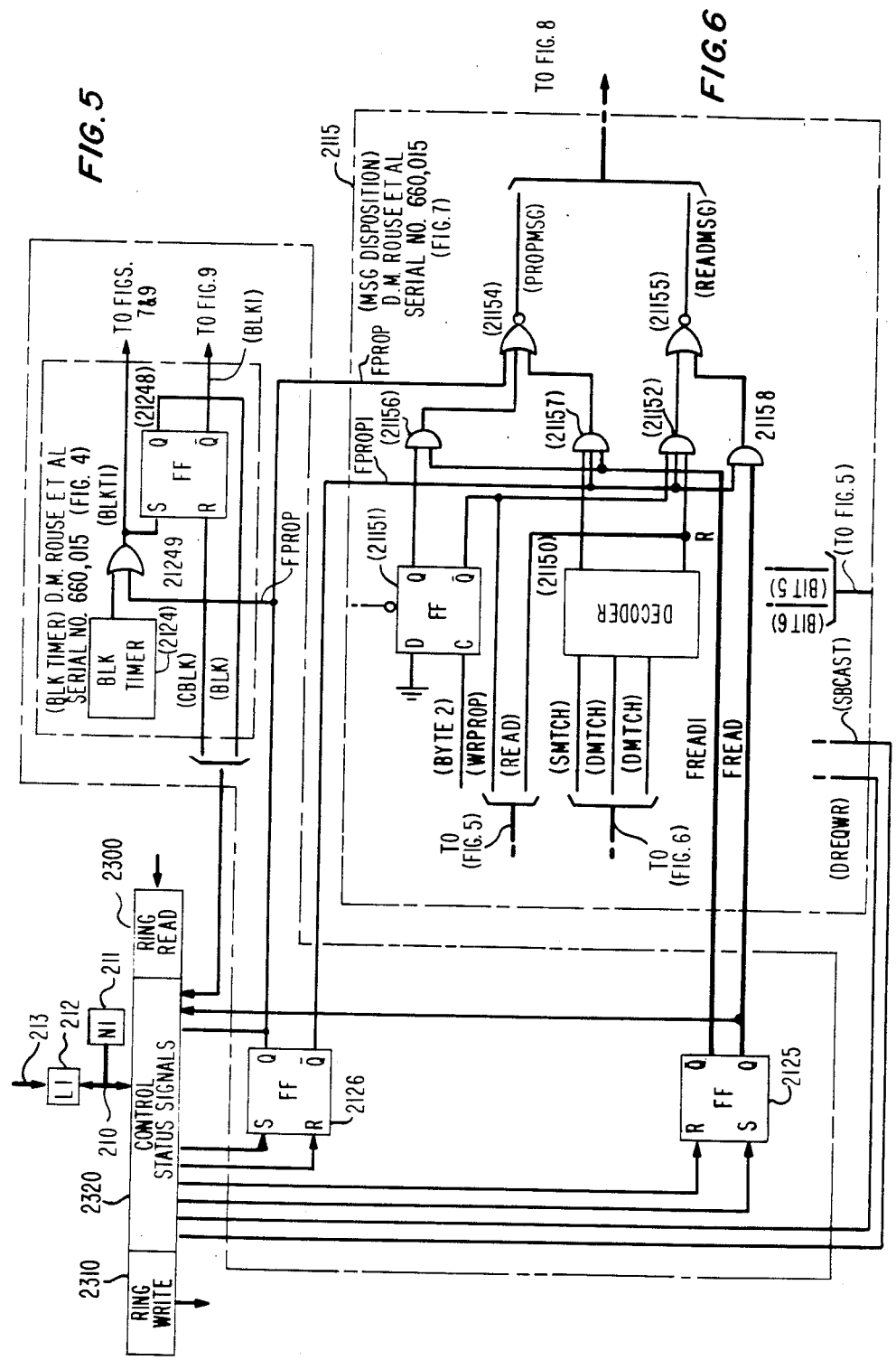

RING PACKET SWITCH

BACKGROUND OF THE INVENTION

1. Field of the Invention

This invention relates to a data communication network. In particular, it relates to the control of data on data communication networks.

2. Description of the Prior Art

Data communication networks are oftentimes used to interconnect data systems which use the networks to both send and receive data. Typically, such data communication networks may comprise ring transmission paths which are interconnected by ring interface apparatus associated with and used to couple data systems with the ring transmission paths. In such a network data is usually transmitted from an originating data system to the associated ring interface apparatus over a ring transmission path to other ring interface apparatus coupled with a receiving data system.

A data communication network may comprise data systems each connected directly to a single point of a ring transmission path and arranged so that the data systems control the flow of data, hereinafter referred to as data traffic, on the ring transmission path. Other data communication networks are arranged such that a master station connected to a single point of a ring transmission path controls data traffic of the network. In yet other types of data communication networks such as the type of networks described in U.S. Pat. No. 4,554,659, issued Nov. 19, 1985, and in the co-pending application of D. M. Rouse et al., Ser. No. 660,015 filed Oct. 11, 1984, various sectors of the ring transmission paths handle varying amounts of data. Thus, at any one time several sectors of these data communication networks may be handling a large amount of data traffic while other sectors of the network may be handling either medium or small amounts of data traffic.

A problem arises with prior art data communication networks using data systems or a master station connected to a single point in a data communication network to control data traffic in all ring transmission path sectors comprising the network. For example, a master station connected to a single point in a data communication network may lose control of the network if a fault occurs which may open the connection of the master station with the network. In addition, the use of a master station connected to a single point of a data communication network to control data traffic in various sectors of the network increases the data traffic in the ring transmission paths used to convey data between the master station and various sectors of the network.

Accordingly, a need exists for a data communication network arranged for controlling data traffic in various sectors of the network. A need also exists for a data communication network arranged to selectively couple a master station or network control processor with various sectors of transmission paths of the network to control data traffic of the data communication network.

SUMMARY OF THE INVENTION

The foregoing and other problems are solved and a technical advance is achieved by a data communication network having a network control processor and transmission paths interconnected by nodes for use in coupling data systems with the transmission paths. The network is arranged for coupling the network control processor with various sectors of the transmission paths and apparatus is provided for selecting coupling apparatus to enable the network control processor to control the transmission of data in various sectors of the network transmission paths.

In accordance with the invention, an executive node is provided for use in selectively coupling a network control processor with a data communication network having transmission paths interconnected by nodes coupling data systems to the network. The executive node has apparatus interconnecting ones of the transmission paths for coupling the network control processor with various sectors of the data communication network and is responsive to the network control processor for selecting ones of the interconnection apparatus to enable the network control processor to control transmission of data in various sectors of the data communication network.

Also in accordance with the invention, an executive node for selectively interconnecting a network control processor with various transmission path sectors of a data communication network comprises interconnection logic apparatus positioned in the sectors of the data communication network for interconnecting ones of the transmission paths and for coupling ones of the interconnected transmission paths with a data bus interconnected with the network control processor.

Also in accordance with the invention, an executive node for selectively interconnecting a network control processor with various transmission path sectors of a data communication network to control data message traffic on the network has apparatus interconnecting ones of the transmission paths comprising logic circuitry enabled by the network control processor for selectively controlling the interconnection apparatus to force read all data messages received on incoming ones of the transmission paths onto a data bus interconnected with the network control processor.

In further accordance with the invention, an executive node for selectively interconnecting a network control processor with various transmission path sectors of a data communication network to control data message traffic on the network has apparatus interconnecting ones of the transmission paths comprising logic circuitry enabled by the network control processor for selectively controlling the interconnection apparatus to propagate data messages addressed to the network control processor and received on incoming transmission paths onto outgoing transmission paths and a data bus interconnecting the interconnection apparatus with the network control processor.

DESCRIPTION OF THE DRAWING

The foregoing, as well as other objects, features and advantages of the invention will be more apparent from a description of the drawing in which:

FIG. 4 is a functional diagram of the byte organization of a header portion of a network data message;

FIG. 5 sets forth logic circuitry for enabling the executive node set forth in FIGS. 1 and 2 to selectively interconnect a network control processor with various transmission path sections of a data communication network;

FIG. 6 illustrates message disposition apparatus of the instant executive node for deriving information defining disposition of network data messages;

Figure 1:
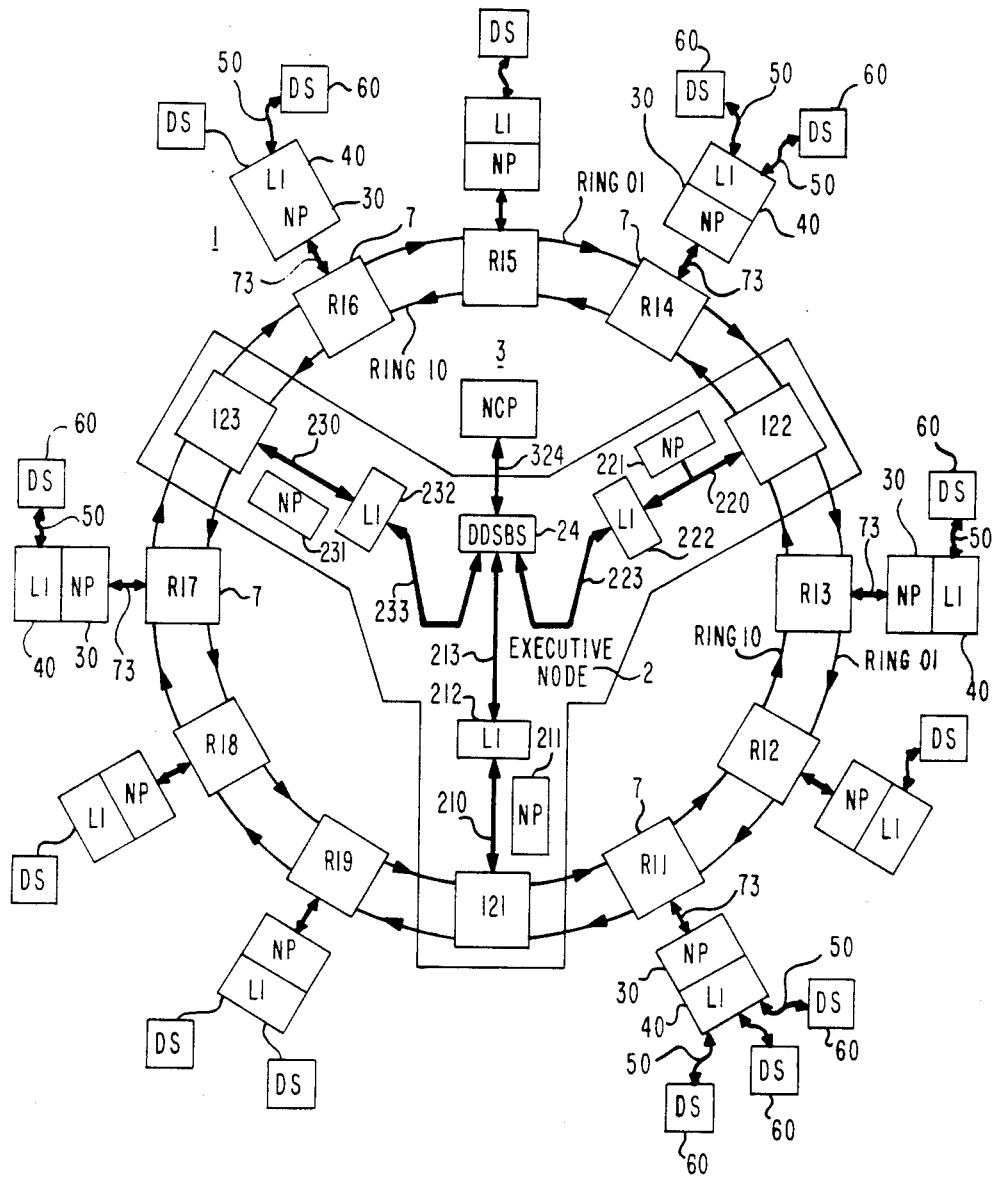
FIG. 1 is a block diagram of a data communication network utilizing the principles of the instant invention.

The detailed logic circuitry of the data communication network node set forth in FIGS. 4 through 9 of the drawing is performed by logic gates and registers, the operation of which are well-known in the art. Details of similar gates and registers are described by J. Millman and H. Taub in the text book *Pulse, Digital and Switching Waveforms*, 1965, McGraw-Hall, Inc., and in *The TTL Data Book for Design Engineers*, Second Edition, 1976, Texas Instruments Incorporated.

For the purpose of illustration, FIGS. 4 through 9 of the drawing employ apparatus set forth in a type of data communication network disclosed in the aforementioned U.S. Pat. No. 4,554,659 and application D. M. Rouse et al. In order to facilitate a clear understanding of the instant invention, such apparatus designations have been retained and are enclosed in parenthesis to facilitate cross-reference with the patent and application from which they were derived.

GENERAL DESCRIPTION

The present embodiment of the invention is illustrated in conjunction with a type of data communication network disclosed by M. L. Blood et al. in U.S. Pat. No. 4,554,659 and by D. M. Rouse et al. in the aforementioned application. It is to be understood, however, that the present invention is not limited to use with a data communication network so arranged but may be advantageously utilized with other types of data communication networks.

Referring to FIG. 1 of the drawing, data communication network 1 set forth therein comprises transmission paths, hereinafter referred to as ring transmission paths 01, 10 interconnecting a number of nodes RI1 through RI9 each intended to couple data systems 60 with the data communication network. A node 7 such as node RI1, is connected by a data bus 73 with a node processor 3 and with a line interface unit 40 arranged to terminate data links 50 used to couple data systems 60 with data communication network 1. Data systems 60 may be other data communication networks or any one of a number of well-known components such as computers, packet switch networks and data terminals, or the like, and need not be described in detail for an understanding of the invention.

In a normal mode of operation, a data system 60 originates data in the form of a data message and transmits the data message over a data link 50 and through a line interface unit 40 to a node processor 30. Node processor 30 then signals the associated node RI1 that there is a data message available. Node RI1 responds to an indication of a data message available on data bus 73, or to data messages appearing on ring transmission paths 01, 10 by deriving the node disposition of the data message and generating a disposition available signal. Once the node disposition has been derived, node RI1 propagates the data on ring transmission paths 01, 10 through intermediate nodes such as node RI2 to a destination node, such as node RI3, and over data bus 73 to node processor 30 through line interface unit 40 and data line 50 to a receiving data system 60.

Referring to FIG. 4 of the drawing, a data message appearing on data communication network 1 comprises a number of multi-bit data bytes. It is assumed that each data byte comprises eight bits of data and has both a control bit "C" and a parity bit "P". The first six bytes form a header for the data message and identify the source node or network control processor having originated the data message and the destination node or network control processor that is to receive the data message. More specifically, a logical 1 appearing in the "C" bit position of the first data byte identifies the start of a data message. Bits 0 through 3 define hardware control functions of a node and bits 5 and 6 of the first data byte, hereinafter referred to as byte 1, defines the destination control of the message data. For example, code 00 recorded in bits 5, 6 can be used to indicate general broadcast data that is to be received by all nodes and code 10 may be used to indicate that the data is intended for the next node directly following the node propagating the data message. Code 01 may indicate selective broadcast data sent to specific nodes and code 11 may be used to identify data that is being sent to a specific destination node. Data byte 2 may be used to specify the total number of bytes comprising the data message and bytes 3 and 4 contain the address of a node or the network control processor that is the source of the data message. The address of the node or the network control processor for which the data message is destined is identified in data bytes 5 and 6. An 0 or 1 recorded in bit 7 of data bytes 4 and 6 identifies the ring transmission paths 01, 10 on which the data message is propagated from the source node and is to be received by the destination node.

In the exemplary embodiment of the invention, a network control processor 3, FIG. 1, is arranged to control the flow of data messages within the data communication network. Network control processor 3 is a highly reliable network control processor system having a pair of data processors which may be AT&T 3B20S* computers connected in parallel to provide control of the data message traffic generated by data systems 60.

*Trademark of AT&T

An executive node 2, in accordance with the principles of the invention, interconnects network control processor 3 to data communication network 1. More specifically, executive node 2 has a number of node ring interface units herein set forth as ring interface units I21, I22, and I23 each positioned or located in a sector of data communication network 1. A ring interface unit, such as node ring interface unit I21, is provided to interconnect incoming ones of ring transmission paths 01, 10 with outgoing ones of ring transmission paths 01, 10 and for coupling the interconnected ring transmission paths 01, 10 with a bidirectional data bus 210 interconnecting ring interface unit I21 with a node processor 211 and line interface unit 212. Executive node 2 is arranged to selectively interconnect network control processor 3 with each node ring interface unit I21, I22, and I23 so that network control processor 3 can independently control data traffic in various sectors of data communication network 1.

In one mode of operation a data message, originated by a data system 60 coupled with source node RI1 and intended for a data system 60 coupled with destination node RI7, may be propagated by source node RI1 on outgoing ring transmission path 10. The data message is propagated on ring transmission path 10 through nodes RI2, RI3 ring interface unit I22 of executive node 2, nodes RI4, RI5, RI6, ring interface unit I23 and read by destination node RI7 over data bus 73 to data system 60. Data communication network 1 is arranged to propagate data messages between nodes on ring transmission paths 01, 10 at varying rates of transmission speed such that there may be a heavy flow of data messages or traffic on ring transmission path 10 between nodes RI4, RI5, and RI6 and a light flow of data traffic between nodes RI6 and RI7 through ring interface unit I23. In order to relieve congestion on the sector of data communication network 1 between nodes RI4 and RI6, network control processor 3 enables ring interface unit I22 to force read the data message addressed to destination node RI7 and incoming on ring transmission path 10 via executive node 2 into network control processor 3.

In data communication network 1, data messages may be exchanged between data systems 60 and network control processor 3. These data messages are received and sent through a line interface unit 40, over a data bus 73 and propagated by a node, for example, node RI1 on a ring transmission path such as ring transmission path 01. A ring interface unit reappearing on ring transmission path 01 such as ring interface unit I21 of executive node 2 reads the incoming data message addressed to network control processor 3 off ring transmission path 01 onto data bus 210 through line interface unit 212 via node processor NP 211 over data bus 213 through duplex dual serial bus selector 24 and over data bus 324 to network control processor 3.

Other data messages such as maintenance control and broadcast data messages are exchanged between ones of the data communication network nodes and network control processor 3 through executive node 2 and ones of ring interface units I21, I22, I23 over ring transmission paths 01, 10 coupled with nodes of data communication network 1.

At times during the operation of data communication network 1, ring transmission path 10, for example, may be handling a large number of data messages that are being propagated from node RI9 and are addressed to network control processor 3. Such data messages are normally read off ring transmission path 10 by ring interface node I21 onto data bus 210 for transmission to network control processor 3. However the heavy flow of data message traffic being read off ring transmission path 10 at ring interface unit I21 onto data bus 210 may result in data messages incoming on ring transmission path 01 from being denied access to data bus 210 for transmission to network control processor 3. Such a denial of access to data bus 210 coupled with ring interface unit I21 will result in the backup of data message traffic on ring transmission path 01 thereby effecting the efficient operation of the entire data communication network 1. Similarly, ring transmission path 10 having a heavy volume of data messages destined for network control processor 3 in the sector of data communication network 1 represented by nodes RI7, RI8, and RI9 is less available for normal data message traffic generated by data systems 60 coupled with these nodes.

In accordance with the principles of the instant invention, executive node 2 enables network control processor 3 to control the transmission of data messages in this sector of data communication network 1. This is accomplished in that executive node 2 is arranged to enable network control processor 3 to selectively control apparatus of each ring interface unit, for example, ring interface unit I21 to force propagate data messages incoming on ring transmission paths 01, 10 and addressed to network control processor 3 out on ones of the ring transmission paths 01 and 10 extending to nodes RI9 and RI1 respectively. Thus, ones of the data messages addressed to network control processor 3 and appearing on incoming ones of ring transmission paths 01, 10 and which would normally be read onto data bus 210 by the apparatus of ring interface unit I21 are selectively force propagated onto ones of outgoing ring transmission paths 01, 10. The force propagated data messages are then propagated on ring transmission path 01 through nodes RI9, RI8 and RI7 to ring interface unit I23 and on ring transmission path 10 through nodes RI1, RI2, RI3 to ring interface unit I22. At ring interface units I23 and I22 the data messages are read off incoming ring transmission paths 01 and 10, respectively, onto the appropriate data bus 230, 220 for transmission to network control processor 3.

In addition to rerouting data messages addressed to network control processor 3 from an overloaded ring interface unit to ring interface units handling a small flow of data message traffic, executive node 2, as earlier set forth, selectively controls ones of the ring interface units I21, I22, I23 to read data messages off ring transmission paths 01, 10 and reroute them to network control processor 3 to relieve data message congestion on the ring transmission paths. Thus, executive node 2 effectively controls data message traffic on various sectors of data communication network 1 thereby increasing the data handling capabilities and efficiencies of data communication network 1 in serving data systems 60.

DETAILED DESCRIPTION

1. Data Message Flow

Figure 2:
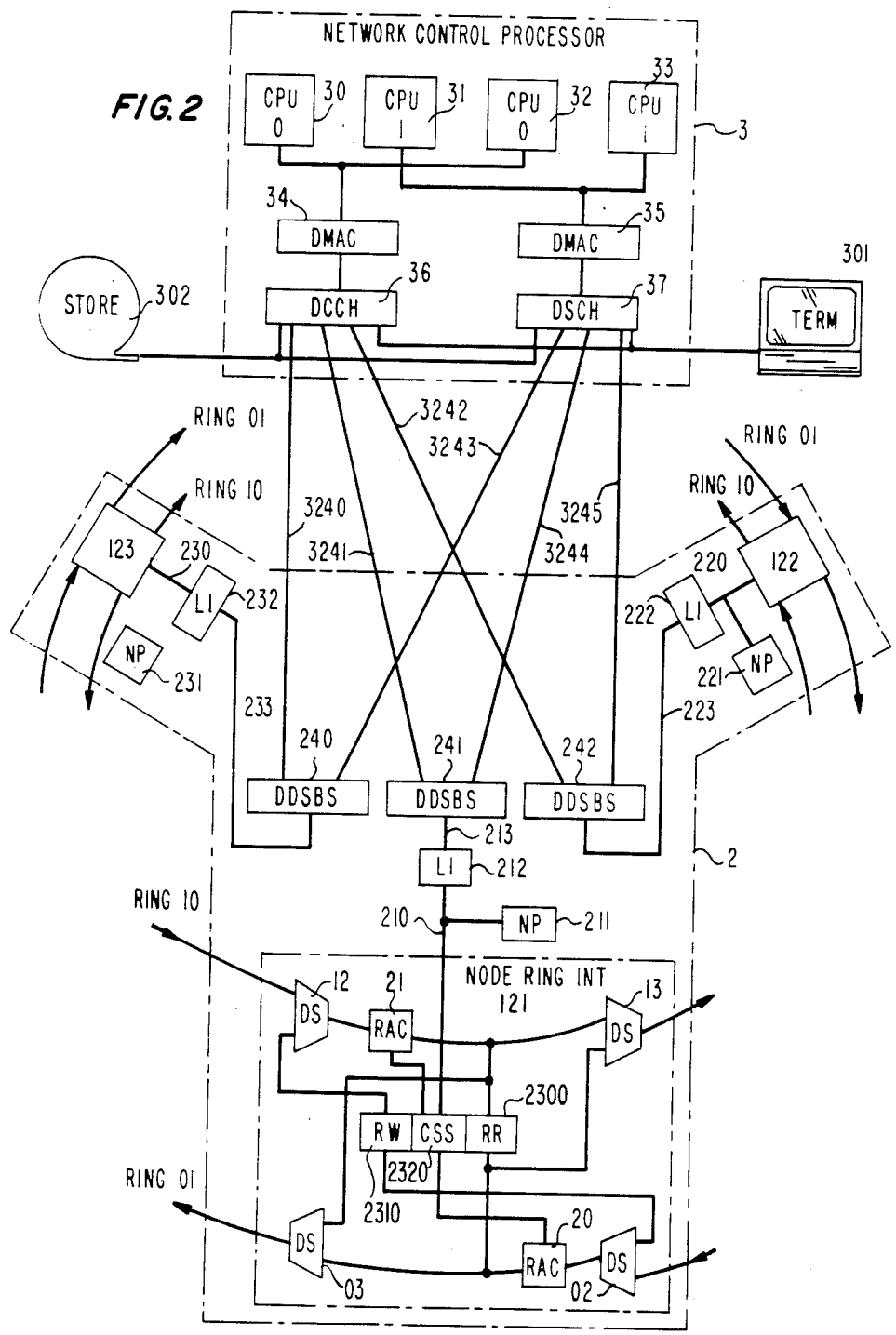
FIG. 2 is a block diagram of executive node apparatus in accordance with the instant invention having multiple appearances on transmission paths of the data communication network set forth in FIG. 1.

Referring now to FIG. 2 of the drawing, network control processor 3 may be a pair of central processor units 30, 32 connected in parallel with another pair of central processor units 31, 33 to provide a highly reliable means for controlling operation of data communication network 1. Each central processor unit, such as central processor unit 30, maybe an AT&T 3B20S computer system and need not be disclosed in detail for an understanding of the principles of the instant invention. A pair of central processor units such as central processor units 30, 32 and 31, 33 are connected by a data bus with a direct memory controller 34, 35 for enabling data messages to be directly read into or written out of the memories of the central processor units. Each direct memory controller 34, 35 is coupled with a dual serial channel unit 36, 37, respectively, used as input and output ports for network control processor 3. A data bus such as data buses 3240 through 3245 couple each dual serial channel unit 36, 37 with the duplex dual serial bus selectors 240, 241, and 242 of executive node 2. Each duplex dual serial bus selector 240, 241, and 242 provides a conversion between a serial format of the data buses 3240 through 3245 coupling duplex dual serial bus selectors 240, 241, 242 with dual serial channel units 36, 37 and the parallel format of the data buses 213, 223, 233 interconnecting duplex dual serial bus selectors 240, 241, and 242 with ring interface units I21, I22 and I23. In addition, duplex dual serial bus selectors 240, 241, 242 serve the purpose of interconnecting ones of data buses 233, 213, and 223 coupled with ring interface units I23, I21, and I22, respectively, with appropriate ones of data buses 3240 through 3245 coupled with network control processor 3. Also associated with network control processor 3 are the requisite memory stores 302 and terminals 301 coupled by data buses with dual serial bus selectors 36, 37 required for operation of data communication network 1.

In the present embodiment of the invention, ring interface units I21, I22 and I23 are identical and may be described with reference to ring interface unit I21. A ring interface unit, hereinafter ring interface unit I21, is connected by a data bus 210 with a mode processor 211 and with a line interface unit 212 arranged to terminate data bus 213 coupling ring interface unit I21 with duplex dual serial bus selector 241. Ring interface units are located at various positions on data communication network 1 for interconnecting ones of ring transmission paths 01 and 10 together and for coupling ones of the interconnected ring transmission paths with data bus 210. An incoming ring transmission path 10 is connected through a data selector 12 and ring access control 21 with data selector 13 and outgoing ring transmission path 10. Similarly, incoming ring transmission 01 is connected through data selector 02 and ring access control 20 with data selector 03 and outgoing ring transmission path 01. The output of ring access control circuit 21 is in addition to being connected with data selector 13, is coupled with data selector 03 and ring read apparatus 2300 so that data messages appearing on incoming ring transmission path 10 may be selectively propagated through data selector 03 on outgoing ring transmission path 01 and read onto data bus 210 through ring read apparatus 2300. Data messages appearing on incoming ring transmission path 01 may, in addition to being propagated on outgoing ring transmission path 01, be selectively propagated on outgoing ring transmission path 10 through data selector 13 and read onto data bus 210 through ring read apparatus 230.

Data messages incoming on data bus 210 may be selectively written through ring write apparatus 231 into ring access control 21 via data selector 12 and propagated through data selectors 13 and 03 onto outgoing ring transmission paths 10 and 01. Incoming data bus 210 data messages may also be selectively written through ring write apparatus 2310 into ring access control 20 via data selector 02 and propagated through data selectors 03 and 13 onto outgoing ring transmission paths 01 and 10, respectively. Hereinafter it is assumed that ring access control 20 is identical with ring access control 21 and that is only necessary to describe the operation of ring access control 21 with the understanding that ring access control 20 operates in the same manner and that both exchange response and control signals with node processor 211 via data bus 210 and control status signals apparatus 2320. In the normal operating state, FIG. 2, network control processor 3 is coupled via executive node 2 and node ring interface unit I21 with ring transmission paths 01 and 10. Logic circuits 2125 and 2126, FIG. 5, have been reset by network control processor 3 transmitting a command that enables control status signals apparatus 2320 to reset logic circuit 2126 to enable an input of AND gates 21157, 21152, 21158 and reset logic circuit 2125 to enable an input of AND gates 21156, 21157.

Figure 3:
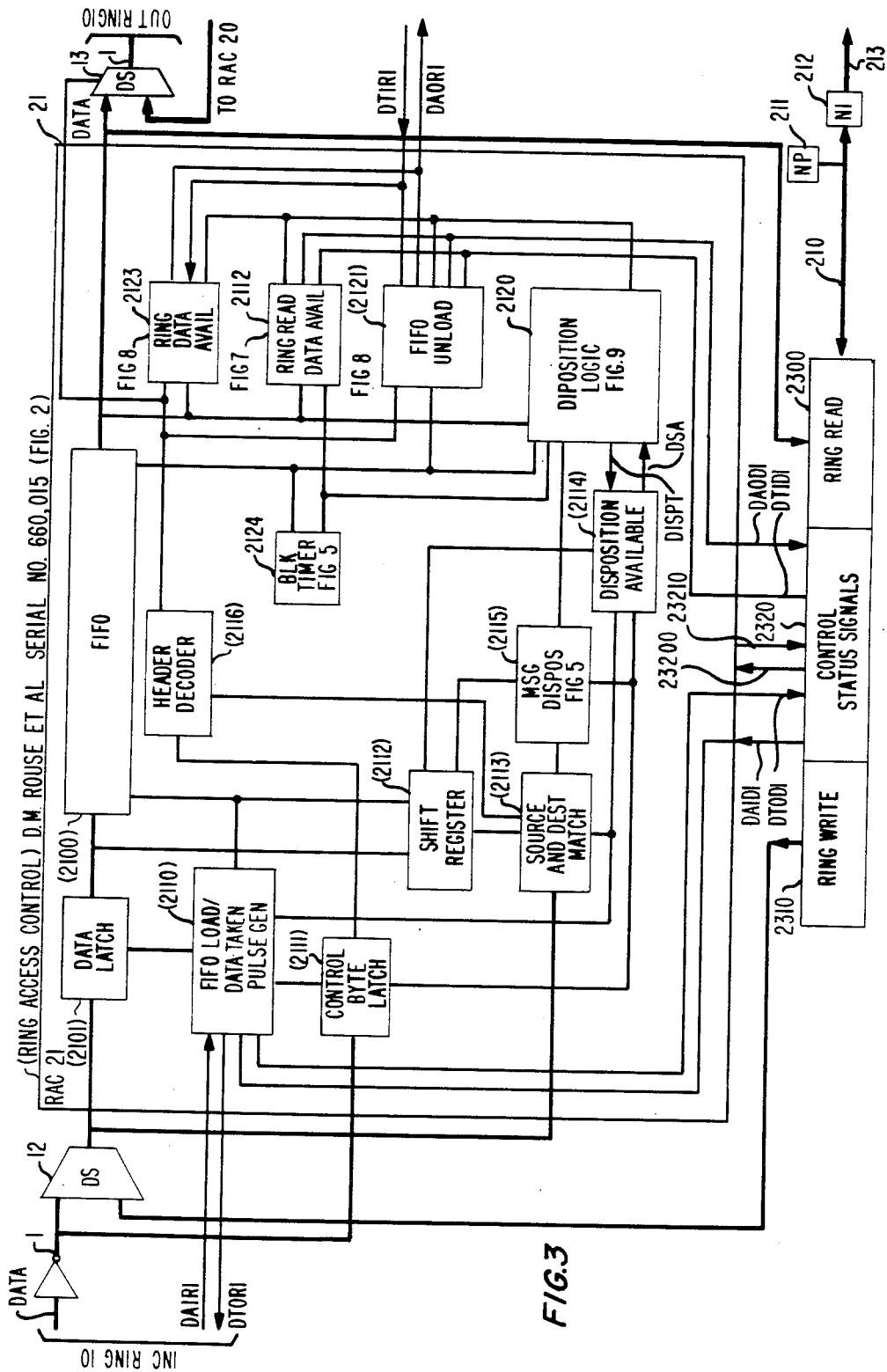
FIG. 3 is a block diagram of apparatus of the executive node set forth in FIGS. 1 and 2 for interconnecting transmission paths and for interfacing a network control processor with incoming and outgoing transmission paths of the data communication network.

Referring now to FIG. 3 of the drawing, the succeeding node on ring transmission path 10, for example node RI9 places a data available signal on lead DAIR1 indicating that the first byte of a data message is available. The FIFO load and data taken pulse generator apparatus 2110 loads the first data byte into FIFO store 2100 via data selector 12 and data latch 2101. Control byte latch 2111 decodes bits 5 and 6 and shift register 2112 advances to the next byte position. FIFO load and data taken pulse generator apparatus 2110 returns a data taken signal on lead DTOR1 to node RI9. The data available and data taken sequence are continued until all of the header bytes have been received by ring interface unit I21. Since it is assumed that the incoming message is addressed to another node on data communication network 1, message disposition apparatus 2115 determines that the message is to be propagated on outgoing ring transmission path 10. Once the disposition of the incoming message has been determined, disposition available apparatus 2114 enables lead DSA.

Disposition logic 2120 in response to the signal appearing on lead DSA and the first byte of the data appearing at the output of FIFO store 2100 directs ring data available apparatus 2123 to place a data available signal on lead DAOR1 extending to the succeeding node which in the present embodiment is assumed to be node RI1. When node RI1 returns, a data taken signal on lead DTIR1 FIFO unload apparatus 2121 unloads the first byte of data onto outgoing ring transmission path 1. Thus, the incoming data message is propagated out on outgoing ring transmission path 10 by disposition logic apparatus 2120 at a transmission rate independent of the transmission rate that the remaining bytes of the incoming data message are propagated into ring interface unit I21 by FIFO load and data taken pulse generator apparatus 2110.

When a data message is addressed to network control processor 3, source and destination match apparatus 2113 determines that the address recorded in bytes 5 and 6 of the incoming data message match the address of ring interface unit I21 and directs decoder 21150 of message disposition apparatus 2115, FIG. 6, to enable lead READMSG as an indication that the incoming message is to be read, FIG. 3, onto data bus 210.

Figures 7, 8:
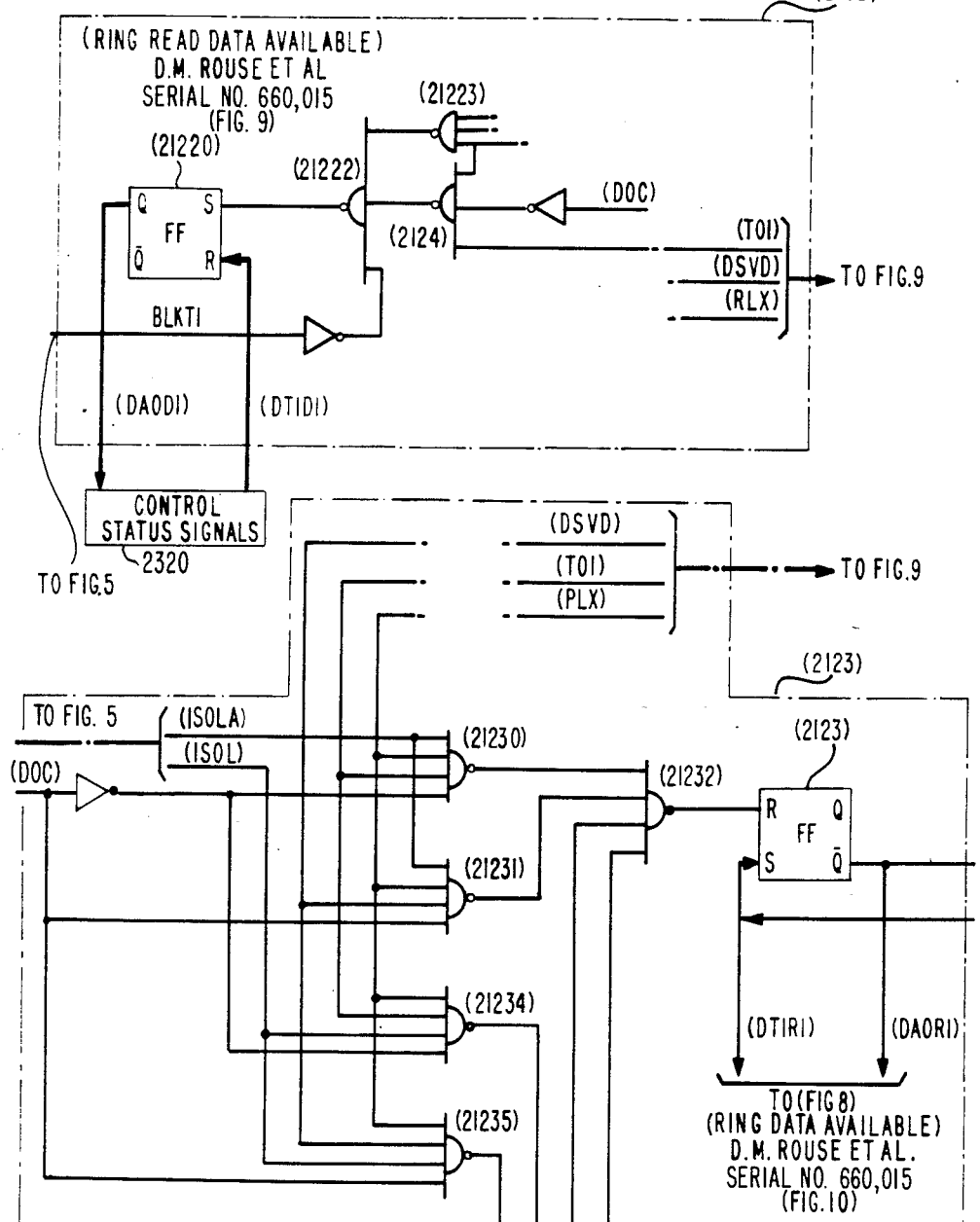
FIG. 7 shows logic circuitry of ring read data available apparatus for indicating a network data message is available at a sector of the transmission paths to be read over a data bus to the network control processor.
FIG. 8 shows logic circuitry of executive node ring read available apparatus for indicating data is available for propagation on outgoing transmission paths coupled with the executive node.
Figure 9:
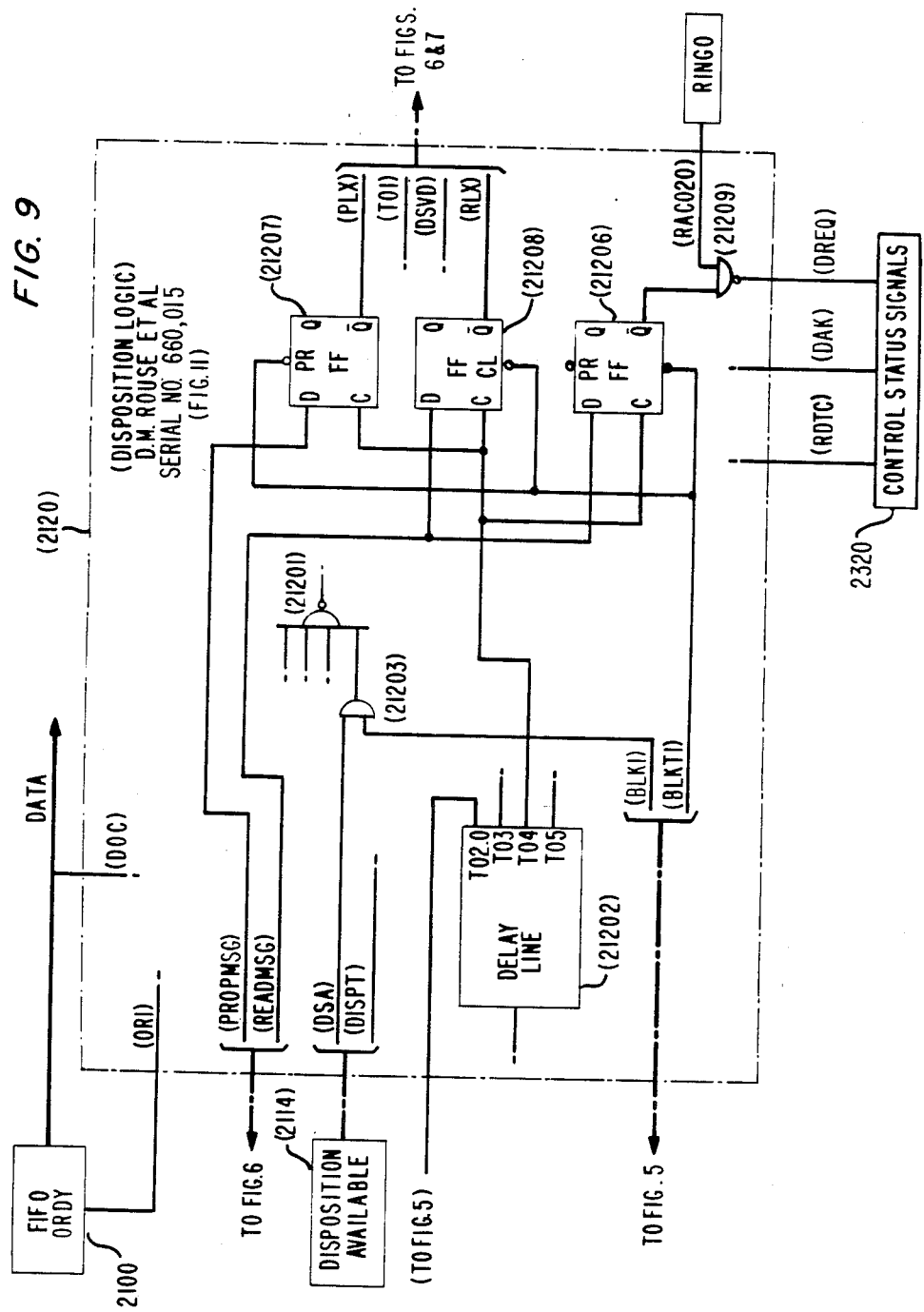
FIG. 9 shows logic circuitry of executive node disposition logic apparatus for controlling the executive node to read and propagate received data on the node data bus and outgoing transmission path of the data communication network.

Disposition logic 2120, FIG. 9, enabled by the first byte of data appearing at the output of FIFO store 2100 and the signals appearing on leads DSA and READMSG enables lead RLX extending to ring read data available 2122, FIG. 7. Logic circuit 21220 responds by enabling data available lead DAOD1 extending to control status signals apparatus 2320. The data taken signal returned on lead DTID1 resets logic apparatus 21220 and enables FIFO unload apparatus 2121, FIG. 3, to unload the data byte from FIFO store 2100 through ring read apparatus 230 and over data bus 210 to node processor 211. The data available and data taken sequence is continued until all of the incoming data message addressed to network control processor 3 is recorded in node processor 211. Subsequently, the data message is read from node processor 211 through line interface 212 over data bus 213, FIG. 2, through duplex dual serial bus selector 241 and over a data bus 3241, 3244 to network control processor 3.

2. Ring Transmission Path Overload

Referring now to FIG. 1 of the drawing, it is assumed that a section of ring transmission path 10 between node RI1 and node RI3 is overloaded. Network control processor 3, detecting the overload condition from information recorded by node ring interface unit I22, transmits a force read message via executive node 2 to ring interface unit I21. The force read message appearing on bi-directional data bus 213 is received through line interface unit 212 and recorded in node processor 211. Subsequently, node processor 211, FIG. 5, transmits a signal over data bus 210 through control status signals apparatus 2320 to set logic circuit 2125 to enable lead FREAD. Lead FREAD enables an input of AND gate 21158 of message disposition apparatus 2115 and returns a signal through control status signal apparatus 2320 to node processor 211 as an indication that node ring interface unit I21 is now in the force read state.

Gate 21158 responds to enabled lead FREAD by controlling NOR gate 21155 to enable lead READMSG extending to logic circuit 21208, FIG. 9, of disposition logic apparatus 2120. When a data byte of an incoming message originally intended to be propagated over outgoing ring transmission path 10 to another node appears at the output of FIFO apparatus 2100, delay line 21202 controls logic circuit 21208 to enable lead RLX. Enabled lead RLX indicates that the incoming data message is to be read off overloaded ring transmission path 10, FIG. 1, onto data bus 210. Ring read data available apparatus, FIG. 7, enables logic circuit 21220 in response to the signal appearing on lead RLX by placing a data available signal on lead DAOD1. Control status signals apparatus 2320 responds to the data available signal on lead DAOD1 by notifying node processor 211, FIG. 3, that data bytes are ready to be read over data bus 210 into node processor 211. When a data byte has been taken, control status signals apparatus 2320, FIG. 7, enables ring read data available apparatus 2122, via lead DTID1, to reset logic circuit 21220.

The data available and data taken sequence is continued at ring interface unit I21, FIG. 2, to read all data messages incoming on ring transmission path 10 and intended to be propagated on overloaded outgoing ring transmission path 10 onto data bus 210 and into node processor 211. Subsequently, data messages read off overloaded ring transmission path 10 at ring interface unit I21 are transmitted, via line interface unit 212, data bus 213, duplex dual serial bus selector 241 and data buses 3241, 3244 to network control processor 3. Network control processor 3 examines the destination address, FIG. 4, set forth in bytes 5 and 6 of the header portion of the data message and routes the data message via executive node 2, FIG. 1, to another ring interface unit I22, I23 to write the data message back onto the ring transmission 10 thereby bypassing the overloaded section of ring transmission path 10 between nodes RI1 and RI3. For example, if the data message was destined for a data system served by node RI4, FIG. 1, network control processor 3 could transmit the message to ring interface unit I22 through executive node 2 via data bus 324, duplex dual serial bus selector 24, data bus 223, line interface unit 222, node processor 221 and data bus 220. Ring interface unit I22, currently having logic circuits 2125, 2126, FIG. 5, in the reset state, writes the data message from data bus 220 through ring write apparatus similar to ring write apparatus 2310, FIG. 2, of ring interface unit I21, through data selector 12, ring access control 21 and data selector 13 to be propagated out of ring interface unit I22, FIG. 1, on outgoing ring transmission path 10 to destination node RI4. Network control processor 3 can also transmit the data message through executive node 2, via data bus 324, duplex dual serial bus selector 24, data bus 233, line interface unit 232, data bus 230, node processor 231 and ring interface unit I23, over outgoing ring transmission path 01 to node RI4.

Thus, executive node 2 couples network control processor 3 with various sectors of data communication network 1 and is arranged to select ones of ring interface units I21, I22, I23 to enable network control processor 3 to control the flow of data messages in various sectors of ring transmission paths 01, 10. Once the overload condition of ring transmission path 10 has subsided between nodes RI1 and RI3, network control processor 3, via executive node 2, enables control status signals apparatus 2320, FIG. 5, to reset logic circuit 2125 to restore message disposition apparatus 2115 to normal message operation. Thus, incoming data messages destined to be propagated on ring transmission path 10 are subsequently propagated on outgoing ring transmission path 10, FIG. 2, from ring interface unit I21.

3. Network Control Processor Path Overload

In the operation of data communication network 1, FIG. 1, network control processor 3 may elect to have ring interface unit I22 read data messages off ring transmission paths 01, 10 that where originally intended to be transmitted to network control processor 3 by ring interface unit I21. Network control processor 3 initiates the sequence by transmitting a signal via data link 324, duplex dual serial bus selector 24, data bus 213, line interface unit 212, node processor 211 and data bus 210, FIG. 2, to control status signals apparatus 2320 of ring interface unit I21. Control status signals apparatus 2320, FIG. 5, responds to the signal by setting logic circuit 2126 to apply a signal to an input of NOR gate 21154 of message disposition apparatus 2115 and returning the signal to control status signals apparatus 2320 as an indication that ring interface unit I21 has been set to the force message propagate state.

NOR gate 21154 responds to the signal appearing on the input connected to logic circuit 2126 by enabling lead PROPMSG coupled with an input of logic circuit 21207 of disposition logic apparatus 2120, FIG. 9. When the first byte of a data message originally intended for network control processor 3 appears at the output of FIFO apparatus 2100, disposition logic apparatus 2120 responds by enabling lead PLX. Lead PLX enables the logic circuitry of ring data available apparatus 2123, FIG. 8, to place a data available signal on lead DAOR1 associated with outgoing ring transmission path 10 indicating that the first byte of the data message is ready to be propagated to the next node RI1. Node RI1 responds to the data available signal on lead DAOR1 by returning a data taken signal on lead DTIR1 to set logic circuit 21233. The data available and data taken sequence are continued so that all bytes of the data message originally intended to be read off ring transmission path 10 at ring interface unit I21, FIG. 1, and transmitted to network control processor 3 are instead propagated onto outgoing ring transmission path 10.

All subsequent data messages including those that are intended to be read off ring transmission path 10 at ring interface unit I21 are propagated on ring transmission paths 01, 10 to the appropriate destination node defined by the header bytes of each data message. Those data messages that were intended for network control processor 3 continue around data communication network 1, for example, on ring transmission path 10 and may be read off ring transmission path 10 at ring interface units such as I22 and I23 and transmitted via executive node 2 to network control processor 3. Other messages destined for various data systems 60 are propagated on ring transmission paths 01, 10 and are read off the ring transmission paths at the appropriate destination node and transmitted via data bus 73, processor 3, line interface unit 40 and data line 50 to the receiving data system 60.

Network control processor 3 may direct ring interface unit I21 to again read messages intended for network control processor 3 off ring transmission paths 01, 10 by transmitting a signal via executive node 2 and control status signals apparatus 2320, FIG. 5, to reset logic circuit 2126. Reset logic circuit 2126 enables inputs of AND gates 21152 and 21157 of message disposition apparatus 2115 thereby enabling ring interface unit I21 to resume the normal function of reading data messages destined to network control processor 3 off ring transmission paths 01, 10. Thus, executive node 2, FIG. 1, by selecting ones of the ring interface units I21, I22, and I23 interconnecting ring transmission paths enables network control processor 3 to control the traffic flow of messages in various sectors of data communication network 1.

Summary

It is obvious from the foregoing that the facility, economy and efficiency of data communication networks may be enhanced by a data communication network arranged to selectively couple a network control processor with various sectors of the network transmission paths. It is further obvious from the foregoing that an executive node arranged to selectively interconnect a network control processor with various sectors of the data communication network to control the transmission of data messages on transmission paths of the data communication network facilities the control of data message traffic on various sectors of the network transmission paths thereby improving the efficiency of data communication networks.

What is claimed is:

1. A data communication network having a network control processor and transmission paths interconnected by nodes for coupling data systems with the transmission paths comprising means for coupling the network control processor with various sectors of the transmission paths, and means for selecting ones of said coupling means to enable the network control processor to selectively propagate data on the transmission paths and to reroute transmission path data via the network control processor to control data traffic in the various transmission path sectors of the data communication network.

2. The data communication network set forth in claim 1 wherein said coupling means comprises means located at various positions in the data communication network for interconnecting ones of the transmission paths and for coupling ones of said interconnected transmission paths with a data bus interconnected with the network control processor.

3. The data communication network set forth in claim 2 wherein said interconnecting means comprises means for receiving data on incoming ones of said interconnected transmission paths and data bus and propagating said received data on outgoing ones of said interconnected transmission paths and data bus.

4. The data communication network set forth in claim 3 wherein said selecting means comprises means enabled by the network control processor for selectively controlling said receiving and propagating means to force propagate data received on said incoming transmission paths and addressed to the network control processor on said outgoing transmission paths.

5. The data communication network set forth in claim 4 wherein said selecting means further comprises means enabled by the network control processor for selectively controlling said receiving and propagating means to force read data received on said incoming transmission paths and addressed to ones of the data systems on said data bus to the network control processor.

6. A node for use in interconnecting a network control processor with a data communication network having ring transmission paths interconnecting data systems comprising means positioned in the ring transmission paths for interconnecting ones of the ring transmission paths and for coupling the network control processor with various sectors of the data communication network, and means responsive to the network control processor for selecting ones of said interconnecting and coupling means to enable the network control processor to selectively propagate data on the ring transmission paths and to reroute ring transmission path data via the network control processor to control ring transmission path data traffic in said various sectors of the data communication network.

7. The node set forth in claim 6 wherein said interconnecting and coupling means comprises a plurality of interconnection means each located in one of said various sectors of the data communication network for interconnecting ones of the ring transmission paths and for coupling ones of said interconnected ring transmission paths with a data bus interconnected with the network control processor.

8. The node set forth in claim 7 wherein said interconnection means each comprise means for receiving successive bytes of data on incoming ones of said interconnected ring transmission paths and data bus at one data rate and propagating said received data bytes on outgoing ones of said interconnected ring transmission paths and data bus at other data rates independent of said one data rate.

9. The node set forth in claim 8 wherein said selecting means comprises first logic means enabled by the network control processor for selectively controlling each of said interconnection means to force propagate said bytes of data addressed to the network control processor and received on said incoming ring transmission paths on said outgoing ring transmission paths and on said data bus.

10. The node set forth in claim 9 wherein said first logic means comprises logic apparatus having a first state for controlling said each interconnection means to read each byte of said network control processor addressed data onto said network control processor data bus and having a second state for controlling said each interconnection means to force propagate each byte of said network control processor addressed data on said outgoing transmission paths.

11. The node set forth in claim 10 wherein said selecting means comprises second logic means enabled by the network control processor for selectively controlling each of said interconnecting means to force read bytes of all data received on said incoming transmission paths onto said data bus.

12. The node set forth in claim 11 wherein said second logic means comprises logic apparatus having a first state for controlling said each interconnection means to propagate and read each byte of said data on said outgoing ring transmission paths and data bus in accordance with the address thereof and having a second state for controlling said each interconnection means to force read all said received data on said data bus to the network control processor.

13. An executive node for use in interconnecting a network control processor with a data communication network having ring transmission paths interconnecting data systems comprising a plurality of interconnection apparatus each located in various sectors of the data communication network for interconnecting ones of the ring transmission paths and for coupling ones of said interconnected ring transmission paths with a data bus interconnected with the network control processor, and means for selecting ones of said interconnection and coupling apparatus to enable the network control processor to control transmission of data in said various sectors of the data communication network having first logic means for selectively reading incoming data addressed to the network control processor onto said data bus and propagating said network control processor addressed incoming data on outgoing ones of the interconnected ring transmission paths and having second logic means for selectively reading all incoming data onto said data bus and propagating said incoming data onto said outgoing ring transmission paths and data bus in accordance with addresses recorded in the incoming data.

14. A data communication network having ring transmission paths interconnected by nodes for coupling data systems with the ring transmission paths comprising an executive node for interfacing a network control processor with the data communication network

CHARACTERIZED IN THAT said executive node comprises means located in various sectors of the data communication network for interconnecting ones of the ring transmission paths and for coupling said interconnected ring transmission paths with a data bus interconnected with the network control processor, and means for selecting ones of said interconnecting and coupling means to enable the network control processor to selectively propagate data on the ring transmission paths and to reroute ring transmission path data via the data bus and network control processor to control transmission of the ring transmission path data in said various sectors of the data communication network.

15. An executive node for interconnecting a network control processor with a data communication network having ring transmission paths interconnecting data systems Characterized In That said executive node comprises a plurality of means each positioned in a sector of the data communication network for interconnecting ones of the ring transmission paths and for coupling ones of said interconnected ring transmission paths with a data bus interconnected with the network control processor, means for selecting ones of said interconnecting and coupling means to enable the network control processor to control transmission of data in said various sectors of the data communication network.

first means having one state for reading data addressed to the network control processor and which is incoming on ones of said interconnected ring transmission paths onto said data bus and another state for propagating said network control processor addressed incoming data onto outgoing ones of said interconnected ring transmission paths, second means having one state for selectively force reading all data incoming on said incoming ring transmission paths onto said data bus and another state for selectively propagating and reading said incoming data onto said outgoing one ring transmission paths and data bus, and means for selectively controlling said first and second means to enable the network control processor to individually control transmission of data in various ones of said sectors of the data communication network.

* * * * *